United States Patent [19]

Sebestian et al.

[11] 3,956,179

[45] May 11, 1976

[54] PROCESS FOR THE CHEMICAL MODIFICATION OF SURFACES OF INORGANIC SOLIDS

[75] Inventors: Imrich Sebestian, Dudweiler; Istvan Halasz, Saarbruecken, both of Germany

[73] Assignee: Istvan Helsaz, Saarbruecken, Germany

[22] Filed: Mar. 15, 1974

[21] Appl. No.: 451,418

[30] Foreign Application Priority Data
Mar. 16, 1973 Germany............................ 2313073

[52] U.S. Cl.................................. 252/430; 252/428; 252/431 R; 252/431 C; 252/431 N
[51] Int. Cl.²...................... B01J 31/02; B01J 21/04; B01J 21/06; B01J 21/08
[58] Field of Search......... 252/431 R, 431 C, 431 N, 252/430, 428

[56] References Cited
UNITED STATES PATENTS 2,965,583   12/1960   Houdry et al............... 252/477 R X
3,664,967   5/1972   Stehl.............................. 252/431 R

*Primary Examiner*—Patrick P. Garvin
*Attorney, Agent, or Firm*—Millen, Raptes & White

[57] ABSTRACT

A process for the chemical modification of the surfaces of inorganic solid bodies containing —OH groups, which comprises silanizing the free —OH groups with an alkylhalosilane to covalently bond the alkyl groups thereof to the oxygen atoms of the hydroxyl groups; halogenating or sulfochlorinating the resultant bound alkyl groups to form corresponding haloalkyl or sulfochloroalkyl groups; and replacing the halogen atoms of the resultant haloalkyl or sulfochloroalkyl groups by substitution with a functional group to form a chemically modified, inorganic solid body suitable for use as a stationary phase component in catalysis or chromatography.

20 Claims, 2 Drawing Figures

PROCESS FOR THE CHEMICAL MODIFICATION OF SURFACES OF INORGANIC SOLIDS

BACKGROUND OF THE INVENTION

This invention relates to the chemical modification of the surfaces of inorganic solids with organic molecules. Such chemically modified, inorganic solids serve, for example as stationary phases in chromatography, in catalysts, etc.

The use of solids as stationary phases in chromatography and catalysis is conventional. Such stationary phases have an activity which is too high and are unsuitable for many chromatographic separation problems. By chemical modification of the surface of inorganic solids and by the introduction of the desired functional groups, the physical and chemical properties of the solids can be influenced.

Several attempts have been made to alter the surface of inorganic solids (e.g., of silicon dioxide). Three basic methods can be differentiated, i.e., physically coating the solid body with liquid or solid substances; polymerization of organic reagents onto the surface; and chemical reaction of the —OH groups present on the surface of the solid body.

In chromatographic separation processes, the sample substances present in the gas or liquid mobile phase interact with the stationary phase, and separation takes place by sorption. Solids coated with liquid or solid substances have the disadvantage that the stationary phase "bleeds," i.e., the mobile phase becomes saturated with the stationary phase and is carried out of the separation column. This is especially prevalent in liquid chromatography, and accordingly the use of such stationary phases is greatly limited.

Stationary phases produced by the polymerization of organosilicon compounds, e.g., see C. R. Hastings, W. A. Aue, J. M. Augl, J. Chromatog., 53: 487–506 (1970), show low mass transfer velocities because the resultant layer thickness is too large. Another disadvantage of such stationary phases is that they do not contain any functional groups. However, the selectivity of the stationary phases depends on the respectively present functional groups.

The third method for modifying solid body surfaces is to chemically react the —OH groups present on the solid surface. The oldest such method is the silanization of solid bodies containing silicon dioxide with chloroalkyl silanes. The resultant weakly acidic —Si—OH groups can then be esterified with alcohols; by the use of substituted alcohols, several desired functional groups can also be introduced, e.g., as described in German Pat. No. 1,902,226. While generally satisfactory, the solid bodies modified in this way are susceptible to hydrolysis and thermal degradation.

Another process for the modification of silicon dioxide is disclosed in German patent application No. P 22 36 862.3-41 published Jan. 31, 1974. According to this process silanol groups, e.g., of $SiO_2$, are converted into —Si—Cl groups by chlorination with thionyl chloride. The chlorinated silicon dioxide (e.g., silica gel) is subsequently reacted with amines to form —Si—N bonds. Such products are hydrolysis-resistant but only in a fairly narrow pH range of 4–8, which is insufficient for many applications. For example, in case of such phases, it is impossible to safely regenerate the $HSO_3$ groups (—$NaSO_3$ + HCl ⇌ $HSO_3$ + NaCl), which occupy a special position in cation exchange (e.g., demineralization of water and liquid chromatography) and in catalytic processes; dilute acids, e.g., 1—2N HCl, are employed for the regeneration, which have a pH of below 1. Under these conditions, the —Si—N bond is quickly split and the organic portion detached from the solid body.

U.S. Pat. No. 3,664,967 describes the silanization of silica gel and alumina with alkyl chlorosilanes (having a chain length of $C_{12}$ – $C_{28}$) and vinyl halosilanes. According to this patent, the solids are reacted with alkyl and vinyl chlorosilanes at room temperatures for 3–6 hours and then the residual —Si—Cl groups are reacted with alcohols of a chain length of $C_6$ – $C_{28}$ with the formation of Si—O—C— linkages. Following halogenation, such phases are utilized in liquid chromatography. A disadvantage of these stationary phases is that they contain Si O—C as well as Si—C bonds. It is known that the Si—O—C bond is sensitive to hydrolysis, and accordingly aqueous fluid phases cannot be used with such stationary phases. Furthermore, since these stationary phases do not contain any functional groups, it is impossible to vary their selectivity.

OBJECTS OF THE INVENTION

Accordingly, it is a general object of this invention to provide modified inorganic solid bodies useful as the stationary phase in chromatography.

Another object of this invention is to provide surface-modified inorganic solid bodies having unusually high theoretical and effective plate levels when employed in chromatography.

A further object of this invention is to provide thermally stable and non-hydrolyzable modified inorganic solid bodies having ion exchange properties.

An additional object of this invention is to provide modified inorganic solid bodies onto which a variety of functional groups can be introduced.

A more particular object of this invention is to provide a process for modifying the surface properties of hydroxyl-containing inorganic solid bodies.

Upon further study of the specification and appended claims, further objects and advantages of this invention will become apparent to those skilled in the art.

SUMMARY OF THE INVENTION

Briefly, the above and other objects of the present invention are attained in one aspect thereof by providing a process for the chemical modification of the surfaces of inorganic solid bodies containing —OH groups, which comprises chemically binding alkyl chains carrying reactive hetero atoms to the —OH groups on these surfaces.

BRIEF DESCRIPTION OF THE DRAWINGS

The above and other objects, features and advantages of the present invention will become more fully apparent to those skilled in the art from the following detailed discussion, taken in conjunction with the annexed drawings, wherein.

DETAILED DISCUSSION

Figure 1:
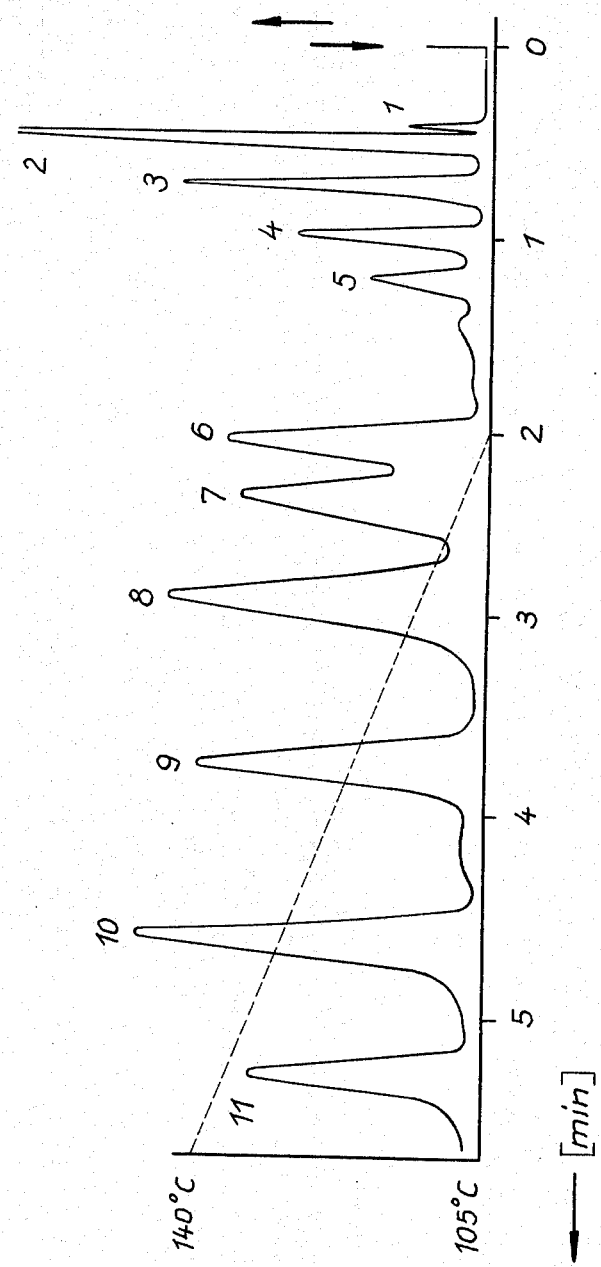
FIG. 1 shows a gas chromatogram obtained in separating a mixture of esters using a modified inorganic solid body of this invention as the stationary phase.

It has now been found that such solid bodies with modified, hydrolysis- and temperature-resistant surfaces are obtained by chemically binding alkyl chains to the surfaces of inorganic solids containing —OH groups by substituting thhe hydroxyl hydrogen with —Si— alkyl in which alkyl chains carry reactive hetero atoms, and that these reactive hetero atoms can then be substituted by desired, chemically functional groups.

Silanization is particularly advantageous for the chemical binding of alkyl chains to such surfaces; in this method, alkyl silanes are reacted with the —OH groups present on the surfaces, which is most simply attained by using alkyl halosilanes. The term "reactive hetero atoms" is understood to mean reactive atoms except for C and H, which can replace H-atoms in the alkyl chains by substitution, e.g., halogen, oxygen, nitrogen, sulfur, etc. Preferably, halogen atoms are introduced as the hetero atoms, as by halogenation or sulfochlorination of the alkyl chains.

For the silanization of the —OH groups on the surface of the solid body, straight or branched chain alkyl chlorosilanes having a chain length of $C_1$ to $C_{18}$ are employed, preferably of $C_1 - C_{12}$ and especially of $C_1 - C_8$. Suitable alkyl chlorosilanes include the monoalkyl trichlorosilanes, dialkyl dichlorosilanes and trialkyl monochlorosilanes. The silanization is effected according to conventional methods, e.g., suspension of the solid body in a suitable inert solvent (for example toluene) and refluxing with an alkyl chlorosilane for several hours under the exclusion of atmospheric moisture by means of a drying cartridge. The solid bodies are subsequently freed of unreacted alkyl chlorosilane by washing with freed solvent and/or by extraction with methylene chloride.

It has been found that solid bodies silanized with alkyl chlorosilanes sometimes still possess free hydroxy groups which interfere in certain applications, e.g., in gas and liquid chromatography. In such cases, it can be advantageous to after-treat the solid bodies silanized with alkyl chlorosilane with non-alkyl chlorosilane silanizing agents, e.g., hexamethyldisilazane, bis(trimethylsilyl)acetamide, etc. Residual free hydroxy groups are thereby silanized and the resultant material is useful in sensitive applications such as gas and liquid chromatography.

The alkyl chains, which have been introduced by silanization according to the invention and which have a very low reactivity, can then be converted into highly reactive haloalkyl chains, e.g., by free radical halogenation; these haloalkyl chains are bound to the surface of the solid body by a Si—C linkage. The thus-introduced halogen can be substituted by functional groups in accordance with conventional chemical halogen substitution methods, whereby the chemical character of surfaces of inorganic oxide solid bodies modified according to the invention can be varied at will. Suitable functional groups are those capable of substitution for the halogen atom in the corresponding alkyl halides, e.g., water or hydroxy to form alcohols; the Williamson synthesis to form esters; ammonia, primary or secondary amines to form primary, secondary or tertiary amines respectively; the formation of sulphonium or phosphonium salts; reaction with sulhydryl compounds to form thiols or thioethers; etc. For example, by reaction with an ammonia ($NH_3$) solution or a sodium bisulfite solution ($NaHSO_3$), —$NH_2$— and —$SO_3H$ groups are introduced, respectively.

Another method of introducing the functional groups is by the reaction of the modified solid body surfaces with organic reagents containing the desired functional groups. For example, amines are linked by a C—N—C linkage to the alkyl chain which is chemically bound to the surface of the solid body. With the use of alcohols or thioalcohols for the introduction of functional groups, C—O—C— or C—S—C— linkages are respectively produced.

Among the large number of suitable reagents, the following examples are set forth: propylamine, ethylenediamine, diethylenetriamine, N,N-dimethylethylenediamine, aminopropionitrile, aminoethanesulfonic acid (taurine), amino acids, ethanol, hydracrylonitrile, polyethylene glycol, 2-nitroethanol, α-hydroxybutyric acid, allyl alcohol, 3-phenylpropanol, p-nitrobenzyl alcohol, glycol monoethyl ether, 1,2-ethanedithiol, propyl mercaptan thioglycolic acid, etc.

It is also useful to introduce —$SO_3H$ groups into the alkyl chains chemically bound to the surface of the solid body, e.g., by sulfochlorination and subsequent hydrolysis. Surprisingly, the yields are very high even with short alkyl chains of 3 – 6 carbon atoms, e.g., an exchange capacity of 500–600 μeq./g. can be readily obtained. Assuming 50 $A^2$ as the space occupied by an —$SO_3H$ group, the theoretically attainable exchange capacity is about 1,000 μeq./g. when using silica gel having a specific surface of 360 $m^2/g$.

In accordance with another embodiment of this invention, the modification of the surfaces of inorganic solid bodies is effected with halogenated lower alkyl halosilanes, preferably lower alkyl chlorosilanes and especially the methylchlorosilanes, e.g., chloromethyldimethylchlorosilane, bromomethylmethyldichlorosilane, etc.

In this case, the reactive —$CH_2$—X groups (X meaning a halogen atom, e.g., Cl or Br) are linked to the solid body surface during the silanization. This method is generally applicable in all cases wherein unreacted hydroxy groups will not interfere with the later desired use of the materials finally obtained. A post-silanization with hexamethyldisilazane cannot be accomplished after this reaction due to the reactivity of the —$CH_2$—X groups (X=Cl, Br) linked with the surface.

The use of haloalkyl chlorosilanes having 3 or more carbon atoms in the alkyl group, e.g., chloropropyltrichlorosilane, for the modification of the surfaces of inorganic solid bodies has the disadvantage that these reagents are not sufficiently temperature-stable and are therefore partially decomposed during the silanization. The surface of the solid body assumes a dark color due to decomposition products. However, such reactants can be employed if special steps such as extended reaction time, use of catalysts and subsequent separation thereof, etc., are taken to reduce the silanization reaction temperature.

Especially suitable inorganic solid bodies for the modification with organic reagents according to this invention are the following: silica gel, porous glass, metallic oxides with acidic hydroxy groups on the surface (e.g., $Al_2O_3$, $TiO_2$, $ZrO_2$, etc.), and inorganic supports, e.g., glass beads, sand, ground bricks, glass and metal capillaries, etc., which are coated on their surfaces with precipitated $SiO_2$ or metallic oxide particles.

The range of application of the solid bodies produced according to this invention with chemically modified surfaces can be further considerably increased by introducing into the alkyl chains bound to the surfaces of the solid bodies, in addition to the above-mentioned examples of chemically functional groups, also polymeric groups, such as polyethylene glycol molecules, e.g., those having a molecular weight of about 200 to about 20,000, or biochemically functional groups, e.g., enzymes, antibodies, antigens, etc.

The invention will be explained by the following examples.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight. The values obtained in the analyses are within commonly accepted limits of error.

EXAMPLE 1 a. 50 g of silica gel having a specific surface area of 360 m²/g iis dried for 12 hours at 200°C under atmospheric pressure, combined with 400 ml of dried toluene and 250 of dimethyldichlorosilane, and refluxed for 10 days under the exclusion of atmospheric moisture. The silanization is terminated when the evolution of HCl has ceased.

Aftertreatment: The silanized product is filtered off, washed with methylene chloride, and dried under vacuum at 180°C for 4 hours. In order to remove the residual hydrogen chloride and to hydrolyze the residual —Si—Cl groups, the silanized silica gel is sequentially washed with methanol, methanol-water (about 1:1), methanol and diethyl ether, and dried for 6 hours at 180°C under vacuum.

The product shows a weak methyl-red adsorption; this indicates that there are several accessible —Si—OH groups on the surface of the solid body. (The methyl-red adsorption is a sensitive detection method for acidic hydroxy groups present on the surface and is known from the literature.) In order to eliminate these groups, the silanized and dried product is suspended in 400 ml of dried toluene and 20 ml of hexamethyldisilazane and refluxed for about 2 days under the exclusion of atmospheric moisture. During this post-silanization reaction, ammonia is produced as the reaction product. The post-silanization is terminated when ammonia is no longer formed. The product is filtered off, washed with methanol and diethyl ether, and dried under vacuum at 180°C for 4 hours. The product shows no methyl-red adsorption, is hydrophobic and is useful as reversed phase in liquid chromatography.

b. The silanized silica gel is suspended in a four-necked 2 liter flask in 1 liter of carbon tetrachloride and 20 ml of bromine. The four-necked flask is equipped with a reflux condenser, an immersible mercury-vapor lamp (type TQ 150, company: Hercaeus, Hanau), thermometer, and gas feed capillary. Under agitation, irradiation with UV light, and introduction of chlorine (20-60 ml/min.), the silanized silica gel is brominated at room temperature or at 50°C for 1½ hours. Then, the product is filtered off, washed several times with methylene chloride, and dried under vacuum at 100°C for 3 hours.

c. 5 ml of ethylenediamine and 40 ml of dioxane are added to 15 g of the thus-brominated product. The mixture is maintained at 70°C for 2 days, then filtered off, washed repeatedly with methanol, methanol-water (1:1), water, methanol, and diethyl ether, and dried under vacuum at 120°C.

The surface of the solid body attains a basic character due to the free —NH₂ groups, is hydrophilic and can be used as a weak anion exchange material.

EXAMPLE 2

15 g of the silica gel silanized and brominated according to Examples 1(a) and 1(b) is combined with 5 ml of hydroxypropionitrile, 5 ml of tripropylamine, and 40 ml of dioxane and allowed to stand for 3 days at 70°C. Tripropylamine binds HBr liberated during the reaction. The thus-obtained product is washed and dried analogously to Example 1(c). The product contains —CN groups present on the surface, is hydrophobic and can be used as stationary phase in gas chromatography.

EXAMPLE 3

15 g of the silica gel silaniized and brominated in accordance with Examples 1(a) and 1(b) is combined with 5 ml of ethanedithiol, 5 ml of triethylamine and 40 ml of diethyl ether and refluxed for 2 days under the exclusion of atmospheric moisture. The thus-obtained product is washed as set forth in Example 1(c), died, and contains —SH groups present on the surface. By oxidation with 5 ml of hydrogen peroxide in 45 ml of glacial acetic acid, the —SH groups are converted into —SO₃H groups; the silica gel modified in this way is a strongly acidic cation exchanger.

EXAMPLE 4

30 g of porous glass having a specific surface area of 60 m²/g and a screen fraction of 90-100 μ (Porasil C, Waters Associates Inc., Milford, Mass.) is silanized by boiling under reflux with 10 ml of dibutyldichlorosilane in 200 ml of toluene for 10 days under the exclusion of atmospheric moisture. The aftertreatment is carried out according to Example 1(a).

The product is brominated analogously to Example 1(b), washed, and dried, then mixed with 10 ml of triethylene glycol in 70 ml of dimethyl sulfoxide and 10 ml of tripropylamine, and maintained at 80°C for 3 days. Tripropylamine binds HBr liberated during the reaction. The product is washed out and dried according to Example 1(c), and is useful as a chromatography stationary phase, e.g., as set forth in Example 1(b).

EXAMPLE 5

20 g of porous glass of the same type employed in Example 4 having a specific surface area of 60 m²/g and a screen fraction of 90-100 μ is silanized with dibutyldichlorosilane in toluene for 10 days and aftertreated in accordance with Example 1(a).

The silanized porous glass is chlorinated with 5 ml of sulfuryl chloride in 100 ml of refluxing carbon tetrachloride. As the free radical initiator, 0.5 g of dibenzoyl peroxide is added. After 2 hours, the same amounts of sulfuryl chloride and dibenzoyl peroxide are again added and the mixture is refluxed for another 2 hours. The chlorinated product is washed several times with methylene chloride and dried under vacuum at 100°C for 3 hours. The mixture is then combined with 10 ml of triethylene glycol and 10 ml of tripropylamine in 70 ml of dimethyl sulfoxide and maintained for 3 days at 70°C, then washed and dried analogously to Example 1(c). The hydrophilic product is useful as stationary phase in chromatography.

EXAMPLE 6

20 g of small glass beads coated with porous $SiO_2$ and having a specific surface area of 15 $m^2/g$ (Corasil II, Waters Associates Inc. Milford, Mass.) are refluxed with dioctyldichlorosilane is toluene for 12 days under the exclusion of atmospheric moisture and aftertreated analogously to Example 1(a). The bromination is conducted according to Example 1(b). The thus-brominated product is reacted with a saturated solution of sodium nitrite in dimethyl sulfoxide for 3 days at 60°C and washed and dried analogously to Example 1(c). The thus-obtained product is hydrophobic, contains nitro groups on the surface, and is useful as packing material in liquid chromatography, especially in the separation of aromatics.

EXAMPLE 7

10 g of the silanized and brominated product of Example 6 are reacted with 28% aqueous ammonia solution in dimethyl sulfoxide (1 : 10 ) for 3 days at room temperature and then washed and dried analogously to Example 1(c). The thus-obtained product is hydrophilic and contains amino groups on the surface; this product exhibits the properties of a weakly basic anion exchanger.

EXAMPLE 8

50 g of silicon dioxide having a specific surface area of 360 $M^2/g$ (ordinary silica gel), is refluxed with 30 ml of tributylmonochlorosilane in 400 ml or xylene of 10 days under the exclusion of atmospheric moisture and aftertreated in accordance with Example 1(a). The silanized silicon dioxide is sulfochlorinated at 0°C for 1 hour in a quartz tube under irradiation with a mercury-vapor lamp (UV light) with the continuous introduction of 30 ml/min. $Cl_2$ and 40 ml/min. of $SO_2$. The sulfochlorinated product is suspended in 400 ml of aqueous 10% sodium sulfite solution and hydrolyzed for 2 days at room temperature. Sodium sulfite buffers the solution to a pH of about 8 and thus accelerates the hydrolysis of the introduced sulfochloride groups to —$SO_3H$ groups. Subsequently, the hydrolyzed product is regenerated with 100 ml of 1.5N HCl and washed neutral with water.

The final product is a cation exchanger with surface-positioned —$SO_3H$ groups and an exchange capacity of 560 $\mu eq/g$.

EXAMPLE 9

20 g of aluminum hydroxide annealed at 200°C, prepared by hydrolysis of aluminum chloride, is mixed with 150 ml of n-octane and 20 ml of bromomethylmethyldichlorosilane and refluxed for 10 days under the exclusion of atmospheric moisture. The silanized product is filtered off, washed several times with methylene chloride, dried under vacuum at 100°C for 4 hours, and then reacted with 4 g of 2,4-dinitrophenylhydrazine in 100 ml of dioxane at 80°C for 2 days.

The final product is washed and dried as set forth in Example 1(c) and contains nitro groups present on the surface. It is useful for the same purpose as the product of Example 6.

EXAMPLE 10

20 g of glass beads coated with titanium dioxide (glass beads from Glaswerk Schott, Mainz) by boiling the glass beads with an aqueous $TiCL_3$ solution, are reacted with bromomethyldimethylmonochlorosilane, washed and dried, as set forth in Example 9. The silanized product is combined with 2 g of taurine (aminoethanesulfonic acid) in 100 ml of dimethyl sulfoxide and maintained for 3 days at 80°C then washed and dried as indicated in Example 1(c). The final product contains —$SO_3H$ groups on the surface and is hydrophilic, making it useful for cation exchange applications.

EXAMPLE 11

20 g of sea sand (Merck, Darmstadt) is refluxed for about 12 hours with 6 N hydrochloric acid washed neutral with water and dired overnight at 180°C. The sea sand is silanized under reflux and under the exclusion of atmospheric moisture for 8 days with 10 ml of octadecyltrichlorosilane in 150 ml of dried isooctane. Aftertreatment is conducted according to Example 1(a). The product is suspended in 800 ml of carbon tetrachloride and 20 ml of sulfuryl chloride and sulfochlorinated under agitation and irradiation with an immersible mercury-vapor lamp (type TQ 150, Heraeus, Hanau) at 5°C for 2 hours. The hydrolysis of the thus-introduced sulfochloride groups and the washing step are conducted as set forth in Example 8, giving a product useful for cation exchange applications.

EXAMPLE 12

10 g of porous glass having a specific surface area of 60 $m^2/g$ and a screen fraction of 90–100 $\mu$ (Porasil C) is silanized and brominated according to Examples 1(a) and 1(b). The product is reacted with 5 ml of N,N-dimethylethylenediamine in 50 ml of dimethylformamide for 2 days at 80°C, then washed and dried in accordance with Example 1(c). The final product is an anion exchanger, e.g., as shown in Example 16.

EXAMPLE 13

20 g of ordinary silica gel having a specific surface area of 360 $m^2/g$ and a screen fraction of 25–32 $\mu$ is silanized according to Example 4, aftertreated according to Examples 1(a) and 1(b), and brominated. The brominated product is reacted with 10 ml of diethylenetriamine in 100 ml of dimethyl sulfoxide for 2 days at 70°C, then washed and dried according to Example 1(c). The product is useful as stationary phase in liquid chromatography (see FIG. 2).

EXAMPLE 14

10 g of the product of Example 13 is reacted with 3 g of chloroacetic acid in 40 ml of dry ethanol in the presence of 2 ml of triethylamine for 2 days at 50°C. The product is washed out and dried according to Example 1(c), and is useful, e.g., as a liquid chromatography stationary phase as shown in Example 16.

EXAMPLE 15

Surface-porous or $SiO_2$-coated glass plates (15 × 5 cm) (laboratory made thin layer chromatography plates) are each treated with dilute hydrochloric acid (1:1) under reflux for 5 hours, then washed neutral with water and dried at 180°C for 12 hours. Silanization with 30 ml of dioctyldichlorosilane in 400 ml of xylene takes place by refluxing for 8 days under the exclusion of atmospheric moisture. The plate is aftertreated in accordance with Example 1(a), then sulfochlorinated with 20 ml of sulfuryl chloride in 400 ml of carbon tetrachloride under irradiation with a mercury-vapor lamp, in accordance with Example 11. The hydrolysis of the thus-introduced sulfochloride groups and the washing step are conducted according to Example 8. Such surface-porous or $SiO_2$-coated glass plates with chemically bound —$SO_3H$ groups are utilized in thin-layer chromatography.

EXAMPLE 16

Figure 2:
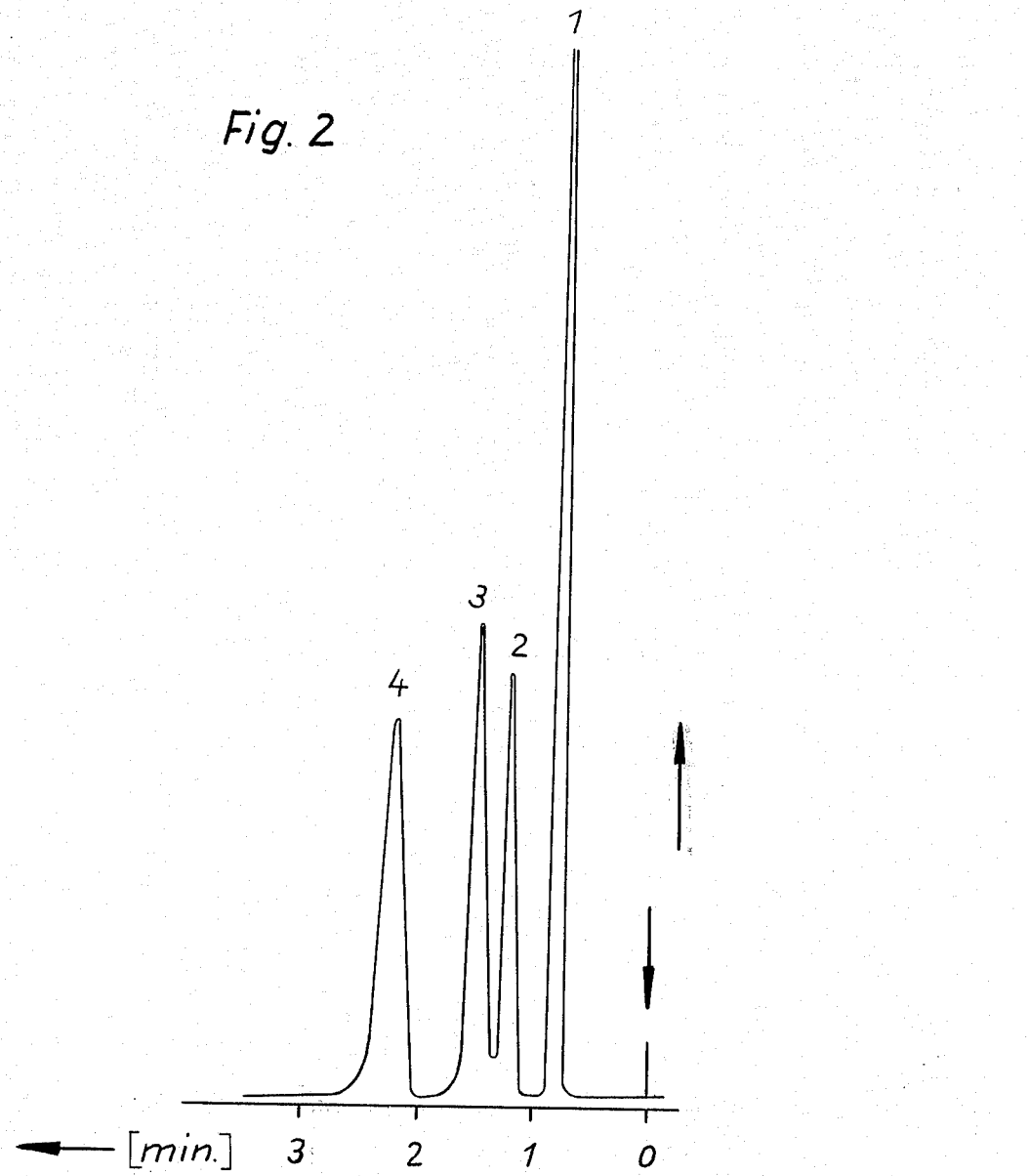
FIG. 2 shows a liquid chromatogram obtained in separating a mixture of three nitroanaline isomers using a modified inorganic solid body of this invention as the stationary phase.

Inorganic solid bodies modified according to the present invention show favorable separation properties when used as stationary phases in gas and liquid chromatography, e.g., referring to the measuring results illustrated in the Table and in FIGS. 1 and 2.

The table combines the values of a separating column, measured by gas chromatography; the stationary phase is an inorganic solid body modified according to Example 4 of the present invention. These values are conventionally determined in chromatography.

FIG. 1 shows a separation of esters by means of gas chromatography. The stationary phase employed is an inorganic solid body modified according to Example 12 of this invention.

FIG. 2 shows a liquid chromatogram obtained with the aid of an inorganic solid body modified in accordnace with Example 13 of the present invention.

The capacity ratio $k'$ is defined by $$k' = \frac{t_R - t_o}{t_o};$$

$t_o$ is the break-through time of an inert substance and $t_R$ is the break-through time of a retarded component.

The height equivalent of a theoretical plate ($h$) is defined as follows:

$$h = \frac{L}{16} \left(\frac{W}{t_R}\right)^2$$

wherein
L is the length of the column and
w is the band width.

$H$, the height equivalent of an effective plate, is related to the value $h$ in accordance with the equation:

$$H = h \left(\frac{1 + k'}{k'}\right)$$

The relative retention ($r_{1,2}$) is defined as the ratio of two capacity relationships:

$$r_{1,2} = \frac{k_1}{k_2}$$

It can be seen from the Table that the theoretical and effective plate levels obtained in accordance with the present invention are extraordinarily advantageous. With a separating column having a length of 50 cm, 1,200 – 1,650 theoretical plates were attained with a time-averaged carrier gas velocity of 6.25 cm/sec.

In FIG. 1, a temperature-programmed separation of esters is illustrated. The sample mixture consisted of: (1) methane carrier gas (inert peak); (2) methyl acetate; (3) methyl propionate; (4) methyl butyrate; (5) isobutyl formate; (6) methyl valerate; (7) butyl acetate; (8) isobutyl isobutyrate; (9) ethyl valerate; (10) cyclohexyl acetate; and (11) ethyl n-heptanoate.

The stationary phase utilized was porous glass having a particle size of 90–100 $\mu$, modified in accordance with Example 12. The length of the column was 50 cm. and the time-averaged carrier gas velocity was 6.5 cm/sec. It can be seen from FIG. 1 that the zero line remains constant even in case of increasing temperatures. The modified solid bodies of the present invention are temperature-stable, typically at least up to 250°C, and are not removed from the modified separating column together with the carrier gas.

FIG. 2 shows an example for the application of the modified solid bodies in liquid chromatography. A separating column was used having a length $L = 50$ cm and an internal diameter of 2 mm, packed with silica gel modified in accordance with Example 13. The mobile phase was N-heptane and methylene chloride in a volume ratio of 5 : 3.5. The velocity of the mobile phase was 1.3 cm/sec. The sample mixture consisted of: (1) methylene chloride (solvent); (2) o-nitroaniline; (3) m-nitroaniline; (4) p-nitroaniline. Under the above-indicated conditions, the three isomers were completely separated.

The hydrolysis stability is especially advantageous with such stationary phases, i.e., water or aqueous solutions can be used as mobile phases.

While not wishing to be bound by any theory of the invention it is believed that the solid bodies modified according to this invention possess a chemically bound monomolecular layer on the surface and that for this reason, the mass-transfer velocities in the stationary phase are high.

Any material having the desired absorptive, structural or chemical properties suitable for a given application can be modified in accordance with the present invention and used in bound or unbound form. Suitable particle sizes and configuration are those known in the art, generally an average particle size of 1 – 1000 $\mu$ and a specific surface area of at least 100 cm$^2$/g, generally of 100 cm$^2$/g – 1000 m$^2$/g and preferably 1 m$^2$/g – 600 m$^2$/g.

Inorganic bodies modified in accordance with the present invention are those adsorbents bearing free hydroxyl groups on the surfaces thereof and include but are not limited to silicon gel and silicic acid; alumina; kieselguhr or diatomaceous earth; celite; adsorptive magnesium silicate ("Magnesol"); calcium hydroxide; mixed silica gel and magnesia (e.g., "Florisil"); clays; etc.

The free OH groups on the surface of the inorganic solid bodies modified according to the present invention are preferably substantially completely reacted by replacing the hydroxyl hydrogen with Si—C bonds such that the modified surfaces exhibit no methyl red absorption, and they are accordingly insensitive to hydrolysis and thus useful in liquid phase applications wherein the mobile phase contains a hydrolyzing amount of water.

TABLE

| Sample | $k'$ | h mm. | H mm. | $r_{1,2}$/ n-Hexane |
|---|---|---|---|---|
| n-Pentane | 0.84 | 0.29 | 1.40 | 0.543 |
| n-Hexane | 1.547 | 0.33 | 0.89 | 1.000 |

TABLE-continued

| Sample | k' | h mm. | H mm. | $r_{i,x}$/ n-Hexane |
|---|---|---|---|---|
| n-Heptane | 2.808 | 0.32 | 0.58 | 1.815 |
| n-Octane | 5.127 | 0.36 | 0.51 | 3.314 |
| n-Nonane | 8.881 | 0.34 | 0.42 | 5.741 |
| 2-Hexyne | 2.807 | 0.32 | 0.59 | 1.815 |
| 3-Hexyne | 2.672 | 0.34 | 0.65 | 1.727 |
| Benzene | 2.554 | 0.33 | 0.63 | 1.651 |
| Toluene | 4.640 | 0.37 | 0.54 | 2.999 |
| Ethylbenzene | 8.170 | 0.37 | 0.47 | 5.281 |
| p-Xylene | 8.818 | 0.39 | 0.48 | 5.700 |
| m-Xylene | 8.923 | 0.38 | 0.47 | 5.770 |
| o-Xylene | 9.750 | 0.38 | 0.47 | 6.303 |
| Chlorobenzene | 7.717 | 0.40 | 0.51 | 4.988 |
| Dichloromethane | 1.450 | 0.32 | 0.93 | 0.937 |
| Chloroform | 2.514 | 0.31 | 0.61 | 1.625 |
| Trichloroethylene | 2.636 | 0.36 | 0.69 | 1.704 |
| Diethyl ether | 2.110 | 0.38 | 0.83 | 1.364 |
| Methyl formate | 1.166 | 0.51 | 1.76 | 0.754 |
| Ethyl formate | 2.126 | 0.38 | 0.82 | 1.374 |
| Methyl acetate | 2.575 | 0.44 | 0.82 | 1.665 |
| Methyl propionate | 4.491 | 0.42 | 0.63 | 2.903 |

$L = 50$ cm.  
$T = 120°$ C.  
$\bar{\mu} = 6.25$ cm./sec.  
$dp = 90 - 100\ \mu$  
$P_o = 0.8$ atmosphere  
$p_i = 2.22$ atmospheres  
$K = 0.47 \times 10^{-7}$ cm$^2$ The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for chemically modifying the free OH-containing surface of an inorganic solid body suitable for use as a stationary phase component in catalysis or chromatography, which comprises:
   a. silanizing said free OH groups with an alkylhalosilane of 1–18 carbon atoms to covalently bond the alkyl groups of said alkylhalosilane to the oxygen atoms of said hydroxyl groups by forming —O—Si-alkyl linkages;
   b. halogenating or sulfochlorinating only said bound alkyl groups to form corresponding haloalkyl or sulfochloroalkyl groups; and
   c. replacing halogen atoms of the resultant haloalkyl or sulfochloroalkyl groups by substitution with a functional group selected from the class consisting of —SO$_3$H, —NH$_2$, —SH, —OH, —CN, —NO$_2$, —NHR —NR$_2$, —NR$_3^+$, —COOH and cresyl wherein R is lower alkyl to form said chemically modified inorganic solid body.

2. A process according to claim 1, wherein the alkylhalosilane is an alkylchlorosilane.

3. A process according to claim 2, wherein the alkylchlorosilane is a methylchlorosilane.

4. A process according to claim 3, wherein the methylchlorosilane is bromomethylmethyldichlorosilane.

5. A process according to claim 1, wherein the functional group is in a protein or polypeptide.

6. A process according to claim 1, wherein the functional group is in a polyethylene glycol having an average molecular weight of about 200–20,000.

7. A process according to claim 1, wherein the inorganic solid body has a specific surface area of at least 100 cm$^2$/g.

8. A process according to claim 7, wherein the solid body is present as a porous layer surface on a gas-impermeable substrate.

9. A process according to claim 7, wherein the inorganic solid body is a material selected from the group consisting of silicon dioxide, silica gel and porous glass.

10. A process according to claim 7, wherein the inorganic solid body is selected from the group consisting of Al$_2$O$_3$, TiO$_2$ and ZrO$_2$ metallic oxides having acidic hydroxyl groups on the surface thereof.

11. A process according to claim 1, further comprising post-silanizing residual OH groups to form a chemically modified inorganic solid body which exhibits no methyl red absorption.

12. A process according to claim 11, wherein the post-silanizing agent is hexamethyldisilazine or bis-(trimethylsilyl) acetamide.

13. In a modified inorganic solid body suitable for use as a stationary phase component in catalysis or chromatography and containing free hydroxyl groups on the surface thereof which have been silanized with an alkylhalosilane of 1–18 carbon atoms to covalently bond the alkyl groups of said alkylhalosilane to the oxygen atoms of said hydroxyl groups by forming —O—Si-alkyl linkages, the improvement wherein:
   said bonded alkyl group is functionally substituted to form a member selected from the class consisting of alcohols, esters, amines, sulphonium salts, phosphonium salts, thiols and thioethers.

14. In a modified inorganic solid body suitable for use as the stationary phase in catalysis or chromatography and containing free hydroxyl groups on the surface thereof which have been silanized to introduce a haloalkyl group, the improvement wherein:
   said haloalkyl groups after silanization have been functionally substituted by replacing a halogen atom with a functional group selected from the class consisting of —SO$_3$H, —NH$_2$, —SH, —OH, —CN, —NO$_2$, —NHR$_1$, —NR$_2$, —NR$_3^+$, COOH and cresyl wherein R is lower alkyl.

15. A modified inorganic solid body according to claim 14, wherein said functional group is selected from the class consisting of —SO$_3$H, —NH$_2$, —SH, —OH, —CN, —NO$_2$, —NHR$_1$, —NR$_2$, —NR$_3^{+3}$—COOH and cresyl wherein R is lower alkyl.

16. A modified inorganic solid body according to claim 14, wherein said functional group is in a protein or polypeptide.

17. A modified inorganic solid body according to claim 14, wherein said functional group is in a polyethylene glycol having an average molecular weight of about 200–20,000.

18. A modified inorganic solid body according to claim 15, wherein said inorganic solid body is selected from the group consisting of Al$_2$O$_3$, TiO$_2$ and ZrO$_2$ metallic oxides having acidic hydroxyl groups on the surface thereof.

19. A modified inorganic solid body according to claim 18, wherein said inorganic solid body is a porous glass having a specific surface area of about 60 m$^2$/g and a screen fraction of 90–100 $\mu$, and wherein said functional group is an amine or an alcohol.

20. In a modified inorganic solid body suitable for use as a stationary phase component in catalysis or chromatography and containing free hydroxyl groups on the surface thereof which have been silanized with an alkylhalosilane of 1–18 carbon atoms to covalently bond the alkyl groups of said alkylhalosilane to the oxygen atoms of said hydroxyl groups by forming —O—Si-alkyl linkages, the improvement wherein:
said free hydroxyl groups are substantially completely reacted by post-silanization such that the modified surfaces exhibit no methyl red absorption, whereby said surface is insensitive to hydrolysis.

* * * * *

UNITED STATES PATENT OFFICE
CERTIFICATE OF CORRECTION

PATENT NO. : 3,956,179
DATED : May 11, 1976
INVENTOR(S) : Imrich Sebestian and Istvan Halasz It is certified that error appears in the above-identified patent and that said Letters Patent are hereby corrected as shown below:

Change the
Name of Assignee from "Istvan Helsaz" to -- Istvan Halasz --.

Signed and Sealed this

Seventeenth Day of August 1976

[SEAL]

Attest:

RUTH C. MASON
*Attesting Officer*

C. MARSHALL DANN
*Commissioner of Patents and Trademarks*